2,816,031

BEER BREWING PROCESS

Walter Specht, Ludwigsstadt, and Wilhelm Eberhard Schultheis, Weissenthurm, near Coblenz, Germany, assignors to Ultra-Technik G. m. b. H., Hamburg-Eidelstedt, Germany No Drawing. Application June 2, 1951,
Serial No. 229,652

Claims priority, application Germany September 27, 1950

20 Claims. (Cl. 99—50.5)

The invention relates to improvements in beer brewing.

The production of beer in breweries consists generally in mashing ground malt with water whereby the "extract" is brought into solution, and in separating the malt solution (first wort) from the malt residues (spent grains), whereupon the solution is boiled with addition of the required amount of hops. The hot wort is then passed over a filter to separate the hops and subsequently cooled, whereby the trub settles out. The wort is then fermented with yeast and after the fermentation is completed, the beer is transferred to storage for aging.

We have found that the production of beer may be made more economical and that beers of superior qualities may be obtained by the application of ultrasonic waves, which term is generally understood to define waves whose frequencies are greater than those which affect the human ear, that is, greater than about 18,000 per second. The ultrasonic irradiation, called hereinafter "sonoration," may be applied to various stages of the brewing process. For instance, hops in the presence of water or aqueous solutions, intermediary products such as mash, wort, glattwasser (last wort), or by-products, such as trub, may be treated, singly or severally, also in mixture with each other, with ultrasonic waves to obtain advantages.

As an ultrasonic generator, e. g. the immersion device type T 300a, rotation irradiator with high frequency generator (1000 kilocycles), built by Ultrakust G. m. b. H., Ruhmannsfelden, Lower Bavaria, may be used. The apparatus is preferably operated with full output, whereby it transmits about 300 watts ultrasonic energy to the treated batch.

The sonoration is preferably carried out at elevated temperatures, e. g. between about 50 to 100° C., which temperatures should be kept constant, and with at least temporary circulation of the treated solution.

A well known drawback of the conventional hopping process, where hops as such are added to the wort, is due to the fact that in the boiling process only about one-third or one-fourth, generally not more than 35 percent, of the bitter principal (resins) contained in the hops pass into the wort, and that, in addition, considerable amounts, e. g. about 3 to 7 percent, of said resins are precipitated during fermentation and storage.

According to the invention, these drawbacks are obviated by subjecting hops to sonoration in the presence of water or aqueous solutions, e. g. softened brewing water, wort, or last wort; hereby the valuable resins of the hops are dispersed in the extracting liquid without objectionable loss, and the thus obtained resin extracts are used for hopping the wort.

As the hop resins are difficultly soluble in water, only limited amounts of said resins can be dissolved in the water or aqueous solutions used as solvents. In addition, the dissolved resins readily precipitate again, particularly in the presence of absorbent substances, such as spent hops, trub, yeast, or carbon dioxide bubbles. The separation of the resins is further assisted by the fact that the pH of the sweet wort changes during fermentation from 5.5 to about 4.5, which reduces the solubility of the resins.

We have found that ultrasonic waves have the effect of producing a fine colloidal dispersion of the difficulty soluble resins in the extract, and at the same time, a stabilization against objectionable precipitation of said dispersed resins in the extract and later in the wort. We believe that this stabilizing action is due to colloidal substances which pass by the sonoration together with the resins into the aqueous liquid, and also to colloidal substances contained in the wort. This may explain the phenomenon that resins isolated by sonoration from the hops and dispersed in the aqueous phase can be concentrated in the extract, even in the acid range, to a considerable extent and that on addition of the resin extracts thus obtained to the boiling wort objectionable precipitation of resins is substantially avoided. Therefore, the resins are essentially retained in the wort and do not pass, to the extent experienced heretofore, into the trub or during fermentation into the so-called curls or into the yeast.

The extraction of the resins by sonoration may be carried out separately in a metal vessel of a suitable size for the batch, e. g. in the hop strainer available in breweries, and the resin extract thus obtained will be admixed to the wort in suitable amounts. For instance, we may mix the allotted amount of hops with the extracting liquid, which has been heated to about 50 to 60° C. or even higher, and first agitate the mixture, for instance by circulation, for several minutes to obtain swelling and only subsequently start the sonoration. As extracting liquid, we may use decarbonated brewing water, or the glattwasser (last wort) obtained by washing (sparging) the spent grains separated from the first wort, or even the first wort itself. The amount of liquid to be added to the hops depends on the desired concentration ratio between hops and liquid. In determining the optimum working conditions, it must be taken into account that the maximum extraction effect is not only dependent on said concentration ratio, but also on the nature and composition of the extraction liquid, the pH value, the extraction temperature, the ultrasonic intensity and the sonoration time. Our experiments were carried out at a temperature of about 50–60° C. and the temperature was kept constant throughout the extraction period. Under these conditions, a sonoration period of about one hour proved generally to be sufficient; sometimes it was necessary to apply a somewhat longer sonoration, e. g. up to two hours, in order to obtain optimum results. The extraction by means of sonoration may, however, be carried through also at higher temperatures, e. g. between 60 and 100° C. with a shortened sonoration.

After completion of the extraction, the resinous extract may be separated from the spent hops, e. g. by filtering with suction, and separately processed.

In large scale experiments, carried out at 50° C. with varying concentration ratios of hops to liquid and varying sonoration times, we found that when we used 23 kg. of hops per 43 hl. of decarbonated brewing water, i. e. a dilution ratio of 1:187, the best results were obtained with a sonoration of two hours. In this case, 53.8 percent of the hop resins were taken up by the extracting liquid, which amount defined the limit of saturation. The pH value was 6.23 at the end of the extraction. In similar comparative tests where glattwasser was used instead of brewing water as extracting liquid, the best result was obtained with a batch containing 200 parts of glattwasser for one part of hops. In this case, an extract containing 45 percent of resins was obtained after one hour of sonoration. The pH value at the end of the extraction was 5.23. When using first wort as extracting liquid, the maximum of the resin concentration was 61.6%. This result was obtained when 200 parts of first wort per one part of hops were irradiated for one hour, whereby the pH value at the end of the extraction was 5.20.

A great number of large-scale comparative tests have shown that the dilution ratio of hops to extracting liquid is preferably maintained between about 1:185 and 1:200 and that the sonoration period should be kept in the range of about 1 to 2 hours. Working in a pH range of about 5 to 6 has proved favorable with respect to a high concentration of the resins, particularly when a thorough separation of the resins from the hop tannin is desired.

It is known that brewing water of a high carbonate content is able to extract more resins from the hops than water of a lower degree of hardness, but that the quality of beers hopped in this way is adversely affected by the simultaneous additional extraction of objectionable hop substances. Our experiments have shown that we could increase the amount of dissolved resins by 60 per cent when, in a batch of 1 part of hops in 666 parts of water, we adjusted the pH of the used brewing water to 7.5; in this case, however, the tannin content of the extract rose to 93% of the soluble hop tannin, which was highly objectionable. Therefore, we prefer to carry out our extraction process by sonoration in the range of weak acidity, particularly in the pH range of 5 to 6.

Comparative tests for determining the solubility of the hop tannins as a function of the batch concentration showed that a batch of 1 part of hops in 333 parts of brewing water contained, after an extraction time of 120 min. at 50 to 60° C. without sonoration, 85.4 percent of tannin. A corresponding batch treated in the same way but subjected to sonoration during the extraction time of 120 min. contained only 22.4 percent of the tannin. In a parallel test with a batch of 1 part of hops in only 150 parts of brewing water, a sonoration of 120 mins. resulted in the extraction of only 6.3 percent of tannin. These tests show, therefore, that the ultrasonic extraction of hops suspensions, in which the ratio of hops to extracting liquid is in the range of about 1:200, furnishes extracts which are relatively rich in bittering and poor in tannin, when compared with conventionally obtained extracts.

We have further found that by the ultrasonic extraction according to our invention the formation of the objectionable hard resins is considerably reduced, which, we believe is due to the favorable redox potential conditions obtaining during the extraction.

The spent hops remaining after the ultrasonic extraction may be added with advantage to the boiling wort for precipitating albumin. It should be noted that these spent hops have a comparatively much higher content of $\beta$-acid and soft resins than of hard resins; therefore, they still possess a certain bittering value.

Analytic tests have proved that the sonoration process of the invention allows of utilizing up to 88 percent of the valuable hops substances, whereas the hop boiling process used heretobefore permitted a utilization of up to about 46 percent only of the resins of the allotted hops. The invention, therefore, results in an additional utilization of about 40 percent of the hop resins. This means that, compared with the conventional boiling process, the wort may be hopped with a considerably, e. g. by 40 percent, reduced amount of hops, and this under conditions which do not affect the normal brewing process adversely. pH curves were plotted down over the whole brewing process in comparative tests, where the process was carried out, on the one hand, according to the regular boiling process with full hops addition, and on the other hand, with 40% savings of hops according to the invention; these curves did not show any difference.

The invention will be explained more in detail in the following example for the production of Pilsener type beer with 173 hl. of hopped wort (11.05%), where instead of the full hops addition, which would amount to 58 kg. of hops (growth 1949), the hopping was carried out with an amount of hops reduced by 40 percent, i. e. with 34.8 kg.

About 22.5 hl. of the first wort (original wort 15.4%) were run off into the hop strainer, the temperature was adjusted to 50 to 60° C., and 17.4 kg. of hops (growth 1949) were added. After a sonoration of one hour, during which about 45 percent of the bitter components of the hops were taken up by the wort, the spent hops and bitter extract were separated. The spent hops were passed immediately into the already boiling wort and participated in the precipitation of albumin. The first wort resin extract (22.5 hl.) was added to the boiling wort so as to be boiled therewith for about another 1.5 hours. When the last wort started to run off, the remaining 17.4 kg. of hops were extracted with 19 hl. of last wort in the hop strainer, which had become available in the meantime, at 50 to 60° C. with sonoration. After a sonoration time of one hour 17 percent of the hop resins had been dissolved. After separation of the resin extract from the spent hops, the latter are immediately returned to the boiling wort while the last wort resin extract is added in such a way that, e. g. 12 hl. are boiled another hour and the remaining 7 hl. another 15 min. only. A hot wort was obtained which has a resin content of 30.26 g. per 1 hl. In a comparative regular brew carried out with the same malt, the same mashing procedure, the same variety of hops, etc. but with full hops addition (58 kg.), the hot wort contained only 14.7 g. of resins per 1 hl., due to the well known resin losses.

In Table 1, we present the results obtained with two brews prepared according to the invention (Nos. 13 and 14) and in comparison with a brew obtained in the conventional process. The hops (growth 1949) used for the tests contained, according to the Wöllmer analysis, 15.12 g. of resins in 100 g. of hops. The normal brew No. (177 hl. of hot wort) was prepared with full hops addition (58 kg. of growth 1949) containing 8769.6 g. of resins, of which only 2341.3 g. ($=26.7\%$) could be found in the coolship wort.

The comparative brews Nos. 13 and 14 according to the invention were prepared with 40% savings in hops. In brew No. 13 (176 hl. of hot wort) as well as in brew No. 14 (173 hl. of hot wort) we used 34.8 kg. of hops (growth 1949, containing 15.12 g. of resins in 100 g. of hops). The hops were extracted in two portions of 17.4 kg. each (as in the example given hereinabove) in about 20 hl. of first wort and separately therefrom in about 20 hl. of glattwasser with sonoration for one and two hours, respectively. The sonorated resin extract solutions were added, as described in the above example, to the boiling wort separately of the spent hops. Calculated on the hops addition of 34.8 kg., 5261.7 g. of resins passed into the brew, of which 4933.5 g. were found in the coolship wort. This corresponds to a 93.8% utilization of the hop resins.

The results of the comparative tests described hereinabove are given in the following table.

TABLE 1

| | Normal brew | Brews according to invention | |
|---|---|---|---|
| Test No. | 10 | 13 | 14 |
| Hot wort in hl. | 177 | 176 | 173 |
| Hops in kg. | 58 (full addition) | 34.8 (40% saving) | 34.8 |
| Resins g./hl. in coolship wort | 14.7 | 27.0 | 30.3 |
| Utilization of hop resins in percent | 26.7 | 88.4 | 93.8 |

When hops of lower bittering value are employed, the extraction of the resins with sonoration according to the invention and with 40% hop savings in analogous brewing and hopping processes results for various beer types in resin values of the worts at least corresponding to those obtained in the conventional processes with full hops addition.

Normally hopped and treated draught beers contain generally only 15 to 25 percent of the resins of the hops employed. By applying our novel process with 40% hops savings, the resin contents of the draught beers can be considerably increased.

While in a Pilsener type beer ("Pils") prepared according to the normal hop boiling process with full addition of hops only 25.6 percent of the resins of the hops used were found (in agreement with the data found in the trade literature), the resin yields increased, in comparative tests in corresponding beers prepared according to the process of the invention with 40 percent of hops savings, up to 42.3 percent, which corresponded to a maximum increase by 65 percent.

The process of the invention is susceptible of various modifications. For instance, the hops need not be extracted separately in first wort and last wort. It is possible to carry out the extraction with sonoration in one batch by means of a suitable extracting solvent and to add the bitter extract thus obtained and the spent hops together and simultaneously to the wort, e. g. at the start of the boiling. Another modification consists in adding the spent hops coming from the ultrasonic resin extraction at the beginning of the wort boiling while the resin extract solution is added to the boiling wort at a later time, e. g. after half an hour or an hour.

According to still another modification, about two-thirds of the ultrasonic resin extract solution is introduced into the boiling wort together with the spent hops, whereas the remaining third of the resin extract solution is stored in a heatable vessel, e. g. at about 70° C., and is added to the boiling wort only a short time, e. g. a quarter of an hour before the wort is drawn off. In this way, the valuable essential oils of the hops are preserved.

In addition to the ultrasonic resin extract, also natural hops may be added to the boiling wort. In this way, the wort can be adjusted to a more or less pronounced bitterness (by chemical conversion of alpha-bitter acid to isohumulone). Also with the addition of natural hops the process can be carried out within the 40 percent hops savings, by extracting the resins from a portion of the reduced quantity of hops with sonoration and by introducing the balance of the hops as such into the boiling process.

According to another modification of the invention, we may add the hops, after a certain amount, e. g. 45 hl., of first wort, has been sparged, to said first wort and extract with sonoration of 1 or 2 hours, without interrupting the further sparging.

The ultrasonic hops extraction may, however, also be carried out after completion of the sparging and addition of the hops in the boiling wort.

Another modificaion consists in carrying out the ultrasonic hops extraction during passage through a special strainer placed between the mash tun and copper. In this way, the runoffs enriched in resins can be collected in another vessel and introduced into the wort in suitable amounts and at suitable times, or the hops bitter extract may pass directly into the brew kettle without separation. The spent hops are then passed from the strainer to the brew kettle after completion of the runs.

The resin extract solutions prepared according to the invention with sonoration may also be concentrated by known procedures, e. g. by vacuum distillation to a syrupy consistence and be employed in this form for the boiling of the wort.

According to the invention, the resins occluded in the trub may be separated and recovered from the trub by sonoration in the presence of water, e. g. brewing water, or an aqueous solution. For instance, about 900 g. of trub may be suspended in 8 l. of brewing water, and the suspension is, after weak alkalinization, e. g. to a pH 8, treated at elevated temperatures, e. g. 50 to 60° C., for 4 hours with 300 watt of ultrasonic energy (1000 kilocycles).

From the total trub of a brew, e. g. 30 kg., which contain calculated 5.85 kg. of dry matter, 66.5 g. of resins, i. e. 1.5 percent of the hop resins introduced in the brew, are recovered. The resin extract solutions recovered from trub, which are practically free of impurities, may be used in the brewing process (wort boiling) or also in the ultrasonic hops extraction as additional quantities of liquor, all the more as the pH value of the bitter extract solution obtained from the trub adjusts itself to about 5.8 at the end of the sonoration.

A Pilsener type beer prepared according to our ultrasonic hopping process, containing an original wort content of 11.55%, was characterized in a report given by the Brewery Experimental Station of the Institute of Technology of Munich at Weihenstephan as follows:

"It is normally fermented, has a favorable pH and an extraordinarily light color and is well saccharified. The protein degradation might be somewhat better, the biological characteristics are excellent. The beer has a mellow and fine taste, is very well adjusted in its bitterness and has also particularly good foaming properties."

Further experiments have shown that a sonoration of mash and wort, preferably at higher temperatures, for instance between 50° C. and boiling temperature, considerably improves the properties e. g. with respect to flavor, taste and composition. For instance, the lingering bitterness of the mash gives way by sonoration to a pleasant sweetness. The iodine test of the mash becomes, in a much shorter time, normal than in the conventional saccharification periods of the brewing process, which we attribute to a degradation of the starch stimulated by the sonoration and to the removal of impurities.

The sonoration of wort results further in a fission of raw maltose, which increases with increasing sonoration times and generally extends to about 10 percent of the maltose after two hours of sonoration. The chaffy smell, which recalls the smell of mash and adheres to the wort, is always substantially removed by sonoration. The flavor becomes considerably finer, purer and more mellow, and causes a particularly fine aroma to arise in the hopped wort, which is irradiated for instance in the copper or coolship due to the activation of the resins and essential oils of the hops. Already after a sonoration of one and a half hours a substantial improvement of flavor and taste is attained. With increasing sonoration time, e. g. up to 60 min. the malty sweetness of the worts increases unmistakably and the bitterness of the worts is perceived as richer. Generally, we do not recommend to exceed a sonoration time of 120 min. since then the gustatively observed improvements retrogress in most cases.

The modifications of the properties of mash and wort obtainable by sonoration favor the start of the fermentation, the course of the fermentation, and the alcohol yield. The fermentation proceeds more quickly, the final fermentation degree is increased, and the maturing time of the beer reduced; the quality and the durability of the beer are improved.

In a test carried out on a commercial scale, where the two mash decoction process was employed, the first mash was withdrawn and the remaining mash was subjected in the mash tub for one hour to sonoration at a constant mash temperature of 52° C. Samples were taken after 15, 30, 45 and 60 min. respectively, which had a pH of 5.51, 5.44, 5.42, and 5.43 respectively. The iodine test was positive in all the samples.

The mash irradiated for 60 min. presented a distinctly sweetish and richer taste, the usual mash smell was considerably reduced. After adding the first mash to the irradiated mash the saccharification took place somewhat quicker than in the normal process. The iodine test was negative more quickly than usual, also when malts of smaller saccharifying power were processed. There were no troubles in the further course of the brewing process, The brew yield was at a pH of 5.18 of the hot wort (155 hl.) normal.

The changes taking place in the composition of the wort (degradation of raw maltose) by sonoration may be seen on a consideration of the following tables:

TABLE 2

*First wort (11.7%)*

| Sonoration | Raw Maltose | | | Taste |
|---|---|---|---|---|
| | g./100 cc. of wort | percent of extract | waste, percent | |
| None | 0.71 | 6.09 | | Normal. |
| 30 min | 0.68 | 5.61 | 4.23 | Normal. |
| 60 min | 0.66 | 5.44 | 7.04 | increased malty sweetness. |
| 120 min | 0.64 | 5.35 | 9.85 | sweeter than the other samples. |

TABLE 3

*Coolship wort (12%)*

| Sonoration | Raw Maltose | | | Taste |
|---|---|---|---|---|
| | g./100 cc. of wort | percent of extract | waste, percent | |
| None | 0.71 | 5.97 | | Normal. |
| 30 min | 0.70 | 5.88 | 1.41 | increasing malty sweetness. |
| 60 min | 0.69 | 5.82 | 2.82 | promounced malty sweetness. |
| 120 min | 0.67 | 5.65 | 5.64 | sweeter and more malty than preceding sample. |

Tables 2 and 3 show that the sonoration of malt in a medium which is rich in malt or dextrine leads to a partial fission of maltose, which increases with increasing sonoration time and after 2 hours of sonoration embraces up to 10 percent of the traceable raw maltose. In accordance herewith the malty flavor of the worts increases with increasing sonoration time whereas the chaffy or mash smell decreases.

In the normal brewing process, the fission of the maltose (into two molecules of readily fermentable dextrose) takes place only in the fermentation stage by the action of the yeast cells. In our sonoration process, said fission of the maltose starts already to a certain extent in the irradiated wort; as a result, certain improvements in the fermentation of the worts and in the alcohol yields, and therefore in the durability of the resulting beer are obtained.

In the test represented in Table 2, the alcohol increased from 3.73 percent by weight in the fermented batch of the wort irradiated for 30 min. to 3.84 percent by weight in the finally fermented wort of the sample irradiated for 120 min.

Also by sonoration of glattwasser, which is carried out preferably also at higher temperatures, e. g. between 50° C. and boiling temperature and with temporary circulation, an improvement of the last wort takes place, particularly with respect to flavor and taste. We have particularly found that the chaffy and mashy smell of last wort is substantially removed by sonoration.

In the extraction or resins or the bitter principal of hops with sonoration and use of e. g. first wort or last wort as extracting liquid, the same reactions take place as described hereinbefore for the sonoration of last wort or wort alone. When first wort is used as extracting agent for the hop resins, the partial degradation of raw maltose, described hereinbefore, takes place, which acts favorably on the later fermentation of the wort and the subsequent processes, such as secondary fermentation and storage of the beer.

Although we have described our invention, setting forth specific embodiments thereof, the invention is not limited to the details described. It will be understood to those skilled in the art that the novel process is susceptible of considerable variations and our invention is not to be limited except by the scope of the claims appended hereto.

What we claim is:

1. In the brewing of beer, the process of improving the resin extraction of the hops, which comprises subjecting the hops in an aqueous medium in the proportion of about 1 part by weight of hops to about 150 to 200 parts of said aqueous medium to irradiation with ultrasonic waves at an energy level of about 300 watts and at a temperature of about 50° C. to boiling temperature, at least temporarily circulating the aqueous medium during irradiation, and hopping the wort with the resin extract thus obtained.

2. A process as defined in claim 1 wherein the hops are extracted by wort.

3. A process as defined in claim 1 wherein the hops are extracted by softened brew water.

4. A process as defined in claim 1 wherein the hops are extracted by last wort.

5. A process as defined in claim 1 wherein the extraction and irradiation is carried out in a weakly acid medium of a pH of about 5 to 6.

6. In the brewing of beer, the process of extracting a portion of the hops to be added in first wort with ultrasonic irradiation, adding the extract and the spent hops to the boiling wort, extracting the balance of the hops in last wort with ultrasonic irradiation, and adding also said second extract and spent hops to the boiling wort.

7. In the hopping of beer, the steps of adding a portion of the hops to the first wort, subjecting said mixture to ultrasonic irradiation at elevated temperatures to extract the hop resins, removing the spent hops and passing them immediately into the boiling wort, adding the obtained first wort hops extract separately to the boiling wort about 1.5 hours before the end of the boiling process, mixing the balance of the hops with last wort, subjecting the mixture to ultrasonic irradiation, removing the spent hops and passing them immediately to the boiling wort, and adding subsequently the last wort resin extract to the boiling wort in two portions, the first portion about one hour and the second portion about 15 min. before the end of the boiling process.

8. In the hopping of beer, the steps of mixing the total amount of the hops to be used for hopping with an extracting liquid selected from the group consisting of first wort and last wort, subjecting said mixture to ultrasonic irradiation, and adding the obtained hop resin extract and the spent hops to the boiling wort.

9. A process as defined in claim 8 wherein first the hop resin extract is added to the boiling wort and the spent hops are added later.

10. A process as defined in claim 8 including the steps of adding a major part but not more than four-fifths of the hop resin extract to the boiling wort together with the spent hops, maintaining the balance of the extract separately at a temperature between 50° and 100° C., and adding said balance in the warm state to the boiling wort toward the end of the boiling period.

11. In the hopping of beer, the steps of adding hops to a first portion of the run-off clarified sweet wort, boiling said wort and hops, and subjecting said boiling wort and hops to ultrasonic irradiation while continuing the clarification of the balance of the wort and adding it to the boiling mixture.

12. In the hopping of beer, the steps of adding the hops to the sweet wort after the wort has been clarified and extracting the hop resins in the boiling wort with ultrasonic irradiation.

13. In the hopping of beer, the steps of subjecting the hops in an aqueous medium at elevated temperatures to irradiation with ultrasonic waves, adding the hop resin extract thus obtained to the boiling wort, and adding, in addition, natural hops to the boiling wort.

14. In the brewing of beer, the steps of suspending the trub separated out in the coolship in an aqueous liquid and subjecting said suspension under weak basic conditions at elevated temperature to the irradiation of ultrasonic waves, thereby extracting the hop resins occluded in the trub.

15. A process as defined in claim 13 including the step of passing the obtained resin extract into the boiling wort.

16. In a process of extracting hop resins from hops, the step of subjecting the hops in an aqueous medium to ultrasonic irradiation in an amount sufficient to increase the rate of resin extraction by said aqueous medium substantially over the extraction rate prevailing in the absence of said ultrasonic energy.

17. In brewing, the step of extracting the hops in brewing liquid, prior to the yeast fermentation, to irradiation with ultrasonic waves, the input of ultrasonic energy corresponding to about 300 watts for amounts of brewing liquid in the range of about 20 to about 175 hl.

18. In the brewing of beer the process of improving the resin extraction of the hops, which comprises extracting hops in an aqueous medium by irradiation with ultrasonic waves for a time of about 60 to 120 minutes, and hopping the wort with the obtained resin extract.

19. In the brewing of beer, the steps of adding hops to wort to extract hop resins, transmitting to the hops in the wort ultrasonic energy in an amount sufficient to increase the rate of resin extraction of said wort substantially over the extraction rate prevailing in the absence of said ultrasonic energy, and subjecting said irradiated hopped wort to fermentation.

20. In the brewing of beer, the steps of adding hops to wort to extract hop resins, transmitting to the hops in the wort ultrasonic energy in an amount sufficient to dissolve in said wort more than 46 percent by weight of the resins contained in the hops, and subjecting said irradiated hopped wort to fermentation.

References Cited in the file of this patent

UNITED STATES PATENTS

| Number | Name | Date |
| --- | --- | --- |
| 2,196,193 | Chambers et al. | Apr. 9, 1940 |
| 2,448,372 | Horsley | Aug. 31, 1948 |
| 2,472,419 | Green | June 7, 1949 |

OTHER REFERENCES

The Influence of Ultrasound Waves on Yeast. H. von Euler and Bol. Skarzynski, Naturwissenschafen 31, No. 33/34:389 (1943), abstract in Wallerstein Laboratories Communications No. 22:226.

Wallerstein Lab. Communications No. 25: pages 194–199, December 1945, vol. VIII.

Wallerstein Lab. Communications No. 24:139, August 1945, vol. VIII.

Wallerstein Lab. Communications No. 28:237, abstract of J. Bact. 51, No. 4:487 (1946).

Ultraschall in der Brauerei (Supersonics in the Brewery) by C. Enders and K. Raible, pub. in Brauwissenschaft No. 3:33–37 (1951), abstract in Wallerstein Lab. Communication No. 45:143.

Bitterstoff durch Ultraschall, ein Verfahren zur. rationellen Hopfung des Bieres. (Bitter Material through Ultrasonics. A Process for the Economical Hopping of Beer), by W. Specht, pub. in Brauwelt No. 11B:200–203, 1951. Abstract in Wallerstein Lab. Communications 46–256.